(12) United States Patent
Stadler et al.

(10) Patent No.: US 6,436,553 B1
(45) Date of Patent: Aug. 20, 2002

(54) CONTINUOUS STEEL STRIP FOR TWIN PRESSES AND METHOD FOR PRODUCING THE SAME

(75) Inventors: Otto Stadler, Hernstein; Roland Schuster, Berndorf, both of (AT)

(73) Assignee: Berndorf Band GesmbH, Berndorf (AT)

(*) Notice: Subject to any disclaimer, the term of this patent is extended or adjusted under 35 U.S.C. 154(b) by 0 days.

(21) Appl. No.: 09/509,558

(22) PCT Filed: Oct. 9, 1998

(86) PCT No.: PCT/AT98/00238
§ 371 (c)(1),
(2), (4) Date: Jul. 26, 2000

(87) PCT Pub. No.: WO99/19109
PCT Pub. Date: Apr. 22, 1999

(30) Foreign Application Priority Data

Oct. 14, 1997 (AT) .......................... A 1739/97

(51) Int. Cl.[7] .................. C21D 9/00; C21D 9/50; B23K 26/08
(52) U.S. Cl. ............... 428/600; 428/610; 428/687; 148/903; 148/512; 219/121.64; 219/121.66
(58) Field of Search ................ 148/512, 903, 148/320, 325; 428/610, 600, 687; 219/121.63, 121.64, 121.65, 121.66, 121.6

(56) References Cited

U.S. PATENT DOCUMENTS

| 3,650,846 A | * | 3/1972 | Holland et al. ............ 148/4 |
| 3,884,749 A | | 5/1975 | Pankoke .................. 156/501 |
| 4,007,351 A | * | 2/1977 | Annerhed et al. .......... 219/50 |
| 4,021,906 A | | 5/1977 | Takahashi ............... 29/407 |
| 4,537,810 A | * | 8/1985 | Held ..................... 428/156 |
| 4,552,596 A | * | 11/1985 | Ichiyama et al. .......... 148/31.5 |
| 4,909,859 A | * | 3/1990 | Nazmy et al. ............ 148/11.5 N |
| 5,269,856 A | * | 12/1993 | Igawa et al. ............ 148/609 |
| 5,861,067 A | * | 1/1999 | Hetzner ................. 148/326 |
| 5,961,751 A | * | 10/1999 | Maruki et al. ........... 148/512 |
| 6,063,215 A | * | 5/2000 | Harrington .............. 148/622 |

FOREIGN PATENT DOCUMENTS

| DE | 3337962 A1 | 5/1985 |
| EP | 0031613 A1 | 7/1981 |
| EP | 0481378 A1 | 4/1992 |
| EP | 0536625 A1 | 4/1993 |
| JP | 60-36623 * | 2/1985 |

OTHER PUBLICATIONS

Patent Abstracts of Japan, vol. 6, No. 26, Feb. 16, 1982 & JP 56 144138 A (Nozawa:KK), Nov. 10, 1981.

* cited by examiner

Primary Examiner—John J. Zimmerman
(74) Attorney, Agent, or Firm—Jacobson Holman, PLLC

(57) ABSTRACT

A continuous steel strip consisting especially of austenitic or martensitic steel, with at least one weld seam running crosswise to the longitudinal extension of the steel strip, for twin presses. The steel strip includes at least one first surface layer which extends essentially across the entire steel strip and which has a different composition to an intermediate layer located between said first surface and a second surface facing the first. The intermediate layer extends essentially across the entire steel strip. The first surface layer consists of the steel of the steel strip and has regularly positioned heat-influenced areas, e.g., zones, situated next to or overlapping each other and/or fusion penetration areas, e.g., zones.

26 Claims, 1 Drawing Sheet

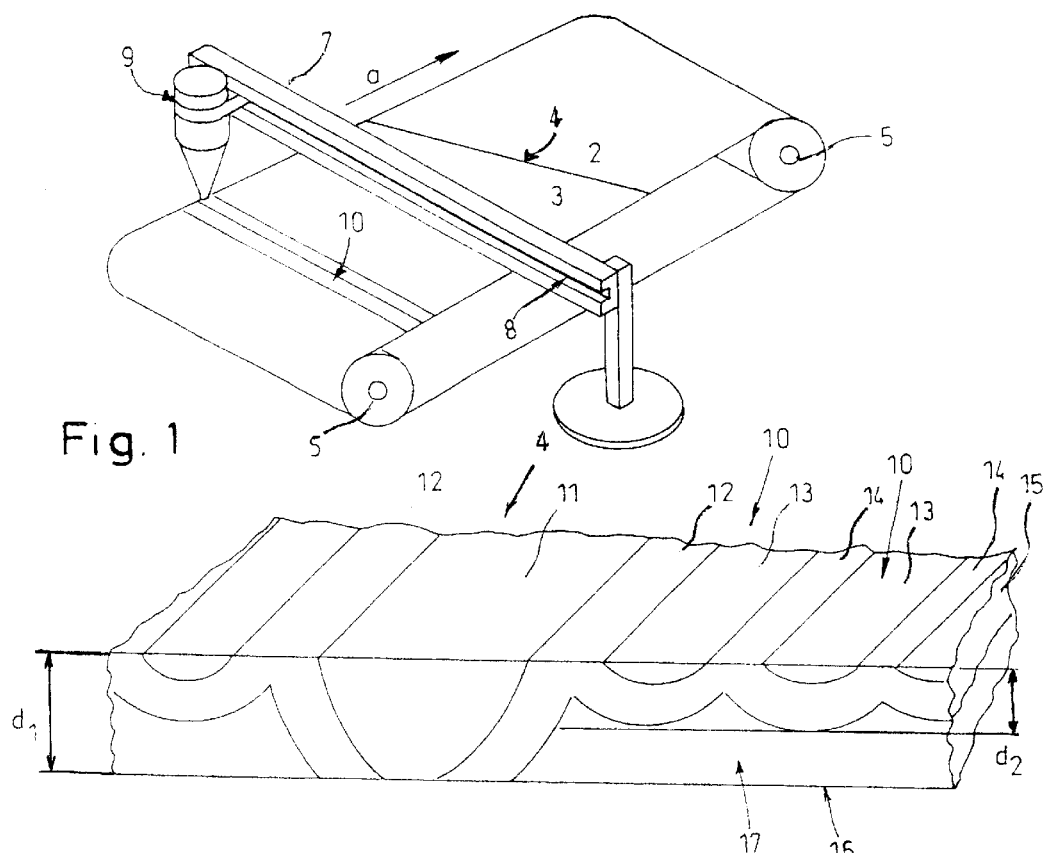
Fig. 1
Fig. 2
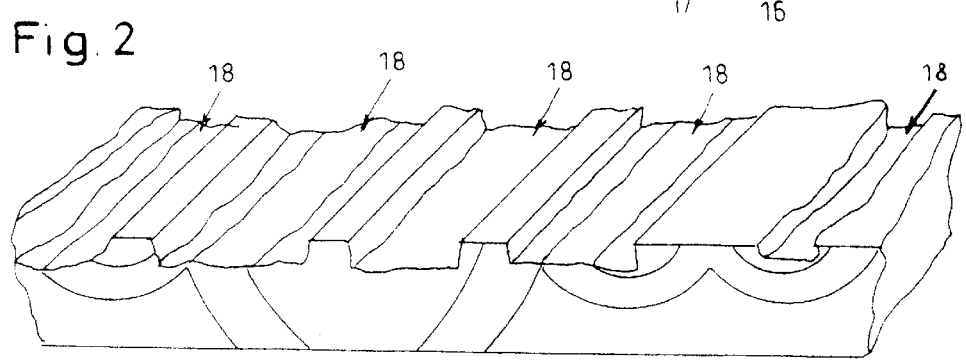
Fig. 3

CONTINUOUS STEEL STRIP FOR TWIN PRESSES AND METHOD FOR PRODUCING THE SAME

This application is a 371 of PCT/AT98/00238 filed Oct. 9, 1998.

FIELD OF THE INVENTION

The invention relates to an endless steel band, particularly such a band comprised of austenitic and/or martensitic steel, having at least one weld seam, for use in double-band pressing; and a method of surface structuring of such an endless steel band.

BACKGROUND OF THE INVENTION

In the manufacture of planar objects, e.g., surface-coated particle board, or panels comprised of resin-impregnated fibers (e.g. with melamine resin), or all-plastic panels (e.g. comprised of polyacrylates or polycarbonates), the desired surface properties, and the bonding of the layers in a laminated product, can be achieved with the use of presses, particularly hot presses. It is known to use a double press for this purpose, having an upper and lower press plate. At least one of these press plates has the desired surface characteristics. To increase the productivity of a press, so-called stacked presses have been developed, wherein a plurality of press plates are superposed, with the regions between the press plates used to accommodate the material which is to be pressed. In this way, a substantial number of panels can be formed in a single pressing operation.

Different surface characteristics can be conferred upon the press plates. Thus it is possible for the press plates to have a highly polished surface, imparting a smooth planar surface to the product. For some applications it may be desirable for the surface to be structured, e.g. in a wood-grain pattern, or with an artistic relief. For this purpose, it is known, in analogy to the manufacture of offset press plates, to apply a photosensitive coating to the press plate, which then is exposed to light. Then, depending on the particular process variant employed, either the photo-exposed or -unexposed region is sensitive to an etchant, and the other region is inert; wherewith the photoexposure provides the basis for pattern-wise etching. This method enables, e.g., three-dimensional reliefs to be fabricated on the surface of a press plate, which reliefs correspond to natural or artificial designs.

Another method of structuring the surface of a press plate is described in Eur. Pat. 0,536,625 A1, according to which a continuous or pulsed laser beam is used to locally remove material over the surface of a mold or a press plate. In order to generate a natural-appearing relief surface, e.g. simulated leather in a pressed plastic article (the final product produced from said mold or press plate), the movement of the laser beam over the (press plate) workpiece surface is coordinated by a random number generator. Another application of this method is in the manufacture of prostheses which are to be integrated into animal or human tissue.

So-called double-band presses have been developed, to improve product quality and production productivity. These have an upper and lower band, which may be comprised of steel, which bands are moved in the same direction at the same speed, providing uniform transport of the workpiece material, which material is disposed in a generally plate-shaped gap between the two bands (which may be endless bands). Such a double-band press is described, e.g., in U.S. Pat. No. 3,884,749. Endless bands in the required thickness and extent, and with the required flexibility, are costly to fabricate; therefore the customary fabrication method is to weld together a plurality of individual sheets having a thickness of 1–3 mm. The welds joining successive such sheets in the longitudinal direction are designated "transverse welds" (to describe the general direction of extent of the weld seam), and the welds (if any) joining neighboring sheets in the transverse directions are designated "longitudinal welds" (the longitudinal direction being the direction of circulation of the band, and the transverse direction being the direction lateral to said circulation direction). It is also possible to have welds with circular or other generally smooth (but closed) contours of extent, employed in patching damaged (or defective) regions. In fabricating a completely smooth planar surface (which is polished or ground), the weld seams generally do not present inhomogeneities.

It is well known that weld seams respond differently to corrosive agents than does the basic material, even if the seams nominally have the same chemical composition as said surrounding material. In the case of weld seams wherein the weld has been produced with added materials, three zones are identifiable which have different properties; viz.:

the added weld material which has been melted during the welding;

the basic material which has been fused during the welding, which basic material was part of the original object to be welded; and the zones of the basic material which have been influenced by the heat of the welding process.

When endless welded, "seamless" steel bands are etched, the weld seams give rise to loci of nonuniformity, which detract from the appearance of the ultimate product produced by the pressing of said bands against a workpiece.

In order to avoid the aforementioned drawbacks, it was proposed, according to Ger. Pat. 3,337,962 C2, to apply an overlayer configured as an electrically nonconducting relief design representing raised and depressed bare metal areas, and then to carry out electrolytic removal of metal. Such a method allows weld seams to be covered but the result is not a homogeneous strip, because in general the material removed is not identical with the underlying support material but tends to be softer. Thus there is a risk that the overlayer will be forced (or worn) away from the surface during use. For an endless band which is mounted around rollers, the outermost layer (or coating) of the band is subjected to the maximum stresses and (as mentioned) is generally softer than the steel strip, so that the service life of such a coated product is substantially less than that of a normal steel band.

The state of the art (closest art to the present invention) is represented by Eur. Pat. 0,031,613 B1, in which a different method of manufacturing a relief pattern on an endless band to be used as a pressing pattern is described. The endless band is provided with a galvanically applied metal coating layer, and an etching process is carried out on said coating. This method can be arranged to eliminate the effect of the weld seam on the final product; however, as a rule the applied metal layer is a metal which is softer than the underlying steel support strip, e.g., copper. When the applied layer is subjected to the strong influences of compressive and tensile stresses it tends to at least partly become forced away, thereby creating undesired loci of inhomogeneity.

SUMMARY OF THE INVENTION

It is an objective of the present invention to devise an endless steel band wherein weld seams, finished surfaces and structured surfaces do not display visually apparent loci of inhomogeneity; wherein the working surfaces have essentially analogous properties, e.g. hardness, to the properties of the underlying steel band; and wherein viewed over the cross section the surface structures have a high homogeneity and have a visually apparently continuous transition to the remainder of the steel band.

The inventive endless steel band, particularly such a band comprised of austenitic and/or martensitic steel, having at least one weld seam extending transversely to the longitudinal direction of the band, said inventive band being intended for use in double-band pressing, has at least one first surface layer which generally extends over the entire area of the steel band, which first surface layer has a different composition from an intermediate layer which intermediate layer also generally extends over the entire extent of the strip and is disposed between said first surface layer and a second surface layer which second surface layer is at the opposite surface of the strip from said first surface layer; and the subject steel band has the following essential characteristics: said first surface layer is comprised of the steel of the steel band, and in particular has generally uniformly heat-influenced regions and/or penetration regions (certain zones), which are disposed neigboring each other or partially overlapping each other.

Because the first surface layer is formed from (or comprised of) the steel material of the steel band, one can avoid appreciable discontinuities in the essential properties of the materials, at least as regards the chemical composition of the materials; and consequently no surface regions are formed which are apt to break away or be forced away when subjected to, e.g., various or varying tensile and compressive stresses. The resulting structures on the surface are essentially identical in both their chemical and physical characteristics, as a result of the, e.g., mutually neigboring and/or partially overlapping heat-influenced regions (e.g. certain zones) and/or penetration regions (e.g. certain zones); accordingly, even when subjected to corrosive actions such as etching, the surface can behave homogeneously and can display a visually homogeneous appearance.

Steels are classified as ferritic, martensitic, or austenitic, based on their metallographic structure in the final heat-treated state. In many steels, two or three metallographic forms may be present simultaneously; e.g., one speaks of austenitic-martensitic or ferritic-austenitic steels. For CrNi steels, the structural representation is given schematically in a Maurer diagram, for steels with C content in the range 0.1–0.5%. The boundaries can be altered by heat treatment, cold forming, or addition of additional alloying elements.

Austenitic CrNi steels, which are important in chemical process engineering, may be classified into the CrNi steels and the CrNiMo steels, in each case with c. 18% Cr, or with 12–25% Cr plus other alloying elements above and beyond Ni and/or Mo. The first representative of this group was a steel introduced to the market in 1912, with 0.25% C, 18% Cr, 8% Ni. Since then, four gradations have been adopted with respect to C content (wt. %):

(a) Extremely low C content (<0.03%);
(b) Reduced C content (<0.07%);
(c) C content up to 0.10%, wherewith in weldable varieties an appreciable portion of the C is bound (stabilized) in carbides via addition of carbide-forming elements such as Ti, Ta, and Nb, in order to combat the tendency to intercrystalline corrosion;
(d) For products not intended for welding (i.e. welding without subsequent heat treatment), CrNi austenitic steels with C content up to 0.15%.

The heat-influenced and penetration regions extend into the depth of the steel band to the extent of 10–50% of the thickness of the band. In considering the requirements for the strength of the steel band and the depth of the structures to be eroded away in the etching, the amount of carburizing and the small amount of material (thinness of the band) should be taken into account.

In forming a relief structure, e.g. a simulated wood-grain structure, on the endless band, the layer thicknesses of the heat-influenced regions and/or penetration regions will vary in relation to the second surface.

If the first surface layer is comprised solely of heat-influenced regions and/or fusion penetration regions, then even when particularly aggressive etchants are employed one can avoid inhomogeneities in corrosion resistance and/or etchability.

If the weld seam is comprised of the material of the steel band and is free of added welding materials, this provides a particularly simple means of avoiding chemical inhomogeneities in the weld seam in relation to the other surface regions.

According to the inventive method of surface structuring of an endless steel band, particularly a steel band comprised of austenitic and/or martensitic steel, wherewith the ends of the band are joined together by welding, wherewith a first surface layer which can extend planarly is provided, preferably over the entire steel band, which first layer has a different composition from an intermediate layer which extends over the entire extent of the steel band, which intermediate layer is disposed between said first layer and a second surface layer opposite to said first layer, which second layer also extends essentially over the entire extent of the steel band, wherewith the first layer is then at least partially removed; the subject method has the following essential characteristics: particularly after the joining of said band ends by welding, said first surface layer which essentially can extend planarly is subjected to a heat influence, particularly a heat influence which corresponds to welding, by means of a heat-treatment device, particularly a welding device, which is moved relative to the steel band, e.g. in a path following a line (which line may have an undulant, Greek key or square wave pattern).

In the production of the weld seam prior to the surface treatment, the thermal influence may move in a path following a line or the like (e.g. in an undulant, Greek key or square wave pattern), wherewith said line of movement (or appreciable parts of same) may be in directions other than that of the weld seam. The described method enables production of a surface structuring which has the visual appearance of being uniform i.e. comprised of a uniform material . If the ends [of the steel band] are joined by welding after the heat treatment of the surface, the weld seam should be directed parallel to the zonewise or line-wise heat treatment. The method enables production of an essentially homogeneous surface with appreciable homogenization of i.e. absence of singularities in the cross section of the steel band. The heat treatment device used may comprise, e.g. welding devices such as electron beam welding devices, IR beam welding devices, or the like.

If a laser, particularly a Nd-yag laser, is employed for the heat-influence (and preferably the welding), a high degree of control of the welding is facilitated, because such lasers allow a particularly high energy density to be achieved. Advantageously, the heat-influence application is carried out in a manner analogous to that used for the welding whereby the ends of the steel band are joined. Lasers such as the described Nd-yag lasers are easy to operate, with high controllability and reliability regardless of whether the laser is operated in a pulsed or continuous mode.

If both the welding and the heat application to form the heat-influenced regions and/or penetration regions are carried out at high energy density per unit of surface area, heat-influencing of the entire steel band can be performed in very rapid fashion, merely by a change in the focusing of the same laser as is used for the welding.

If the heat influence is performed in a Greek key or undular pattern or the like, comprising excursions generally i.e. cumulatively transverse to the longitudinal direction of the steel band, then heat treatment can be performed which is, e.g., parallel to a weld seam whereby the ends of the steel band are joined, which weld seam extends generally transversely to the longitudinal direction of the steel band; and a continuous heat treatment of the entire steel band can be accomplished in similar fashion.

If the steel band is subjected to, in succession, welding, heat influence, and heat treatment (which heat treatment may be solution heat treatment), one can achieve a particularly uniform grain structure (metallographic structure) of the steel band, enabling adjustment of the desired elasticity and hardness of the particular steel band.

If the steel band is subjected to surface treatment, particularly grinding, followed by welding, mechanical machining or the like of the weld seam, and polishing of the weld seam, after which the heat influence is applied, a particularly effective equalization of the weld seam with the remainder of the surface can be achieved.

BRIEF DESCRIPTION OF THE DRAWINGS

The invention will be described in more detail hereinbelow, with the aid of exemplary embodiments, and with reference to the accompanying drawings.

FIG. 1 is a schematic perspective representation of an endless band, with a laser welding apparatus;

FIG. 2 is a detail view of a part of the band, with cross section shown; and

FIG. 3 is a detail view according to FIG. 2, after etching of the band.

DETAILED DESCRIPTION OF THE PREFERRED EMBODIMENTS

The steel band shown in FIG. 1 has its two ends (2, 3) joined by a transverse weld seam 4 (extending generally transversely to the longitudinal direction a of the band). The band is flexible and is passed over and around the rollers (5, 5) which are rotatably mounted to and driven on a frame (not shown); the rollers 5 in turn drive the band. A support 7 extends transversely (with respect to direction a), above the band. A guideway or the like 8 is provided in support 7, along which guideway a laser welding device 9 may be moved back and forth (e.g. via a rack-and-pinion drive driven by an electric motor) (not shown). The path of the laser welding device with respect to the band is arbitrary (e.g. may be a generally undulant, Greek key, or other non-straight-line pattern), wherewith the zones of influence 10 of said device may be configured freely. If desired, the band 1 may be stopped (i.e. moved stepwise, with stopping while the weld device is moved), during which stoppage the excursion of the laser welding device with respect to the band may be normal to the longitudinal direction a; or the band may be moved very slowly, and the support 7 may be inclined to the transverse direction, wherewith the heated zone 10 may again be normal to the longitudinal direction; or the support 7 may extend in the direction transverse to the longitudinal direction of the band, and the heated zone 10 may be at an acute angle to the longitudinal direction of the band.

Alternatively, the zones of heat application may have a generally spiral configuration (not shown) along the periphery of the band, for which the laser welding device 9 is moved very slowly in the direction transverse to the longitudinal direction of the band, and the band itself is advanced at a relatively fast speed. The laser welding device 9 may also be held fixed for an entire excursion of the band, and not be moved one step transversely to the longitudinal direction of the band until a closure i.e. complete closed loop of the heat-influenced zone is achieved. Such an arrangement allows the heat-stressing of the band surface to be kept uniform, so that nonuniformities at the locus of the weld seam are "compensated" (although not completely eliminated).

In the steel band comprised of austenitic or martensitic steel, shown in a sectional (detail view of FIG. 2, the heat-influenced zones 10 (i.e. zones of heat application are disposed parallel to the weld seam 4. The thickness $d_1$ of the steel band is 1.2 mm, and the thickness $d_2$ of the heat-influenced zones is 0.5 mm. The weld seam 4 has been produced with a Nd-yag laser (neodymium-yttrium-aluminum garnet) with 800 Watt heat absorption i.e. energy consumption by the laser?, with movement of the weld head at 1 m/min. The penetration (region 11 is bordered by the heat-influenced regions (12, 12). The zones of heat application 10 have fusion penetration regions 13 and heat-influenced regions 14. Depending on the requirements, the zones may be spaced closely together such that the neighboring penetration regions (11, 11; 13, 13) overlap, such that the entire surface (and a sublayer therebelow) is entirely comprised of penetration regions. Whereas the steel band has a single chemical composition over its cross section, there is a first surface-layer 15 which is physically different (different crystal structure, grain size, and the like) from the second surface-layer 16 at the opposite surface of the band, and different from the intermediate layer 17 between these two surface layers. Layers 17 and 16 have not been subjected to intense heat application. Generally, at the time of formation of the weld seam, the band had already been polished, and thus any subsequent smoothing polishing need only be done in the region of said weld seam. The band may be subjected to a further heat treatment if necessary, to bring about the desired grain structure in the band. E.g., the band may be heated at 1050° C. for a period of 1 hr, in order to relax internal stresses. The resulting band may be subjected to etching as described in the following example, with the etching causing material to be removed in a generally uniform manner, to yield recesses 18 (FIG. 3). The etching away of material is uniform in and among:

the penetration region 11 in the weld seam;

the penetration regions 13 of the zones 10;

the heat-influenced regions 12 of the weld seam; and the heat-influenced regions 14 of the zones 10.

EXAMPLE 1

A steel band comprised of austenitic steel of composition C 0.1 wt. %, Cr 17.1 wt. %, Ni 7.2 wt. %, remainder Fe, of thickness 1.9 mm, was welded in a transverse weld using a Nd-yag laser, with no added weld material. The laser welding device was moved at 1/m/min transversely to the longitudinal direction of the band. The energy absorption by the laser was 800 Watt. The penetration region of the weld seam was 2 mm wide, and the heat-influenced zone was 0.5 mm wide on either side of the penetration region. The surface of the steel band parallel to the weld seam was irradiated by a $CO_2$ laser with energy consumption of 1,000 Watt, which was moved at 0.75 m/min transversely to the longitudinal direction of the steel band. The energy density per unit surface area applied by this $CO_2$ laser was less than in the welding process. The penetration region was 0.2 mm deep, and the thickness of the heat-influenced zone was c. 50% of the thickness of the band. The resulting steel band was moved at 50 cm/hr through an acid etch bath with $FeCl_3$. A generally uniform etching process could be achieved, such that, when the band was subsequently used for impressing a relief onto a substrate coated with melamine resin, there were no visible irregularities in the region of the original weld seam.

EXAMPLE 2

A steel band comprised of martensitic steel of composition C 0.03 wt. %, Cr 15.3 wt. %, Ni 4.9 wt. %, Cu 3.5 wt. %, remainder Fe, of thickness 1.9 mm, was welded in a manner analogously to Example 1, and the band surface was subjected to heating by a $CO_2$ laser, followed by etching in an etch bath with $FeCl_3$. Similarly to Example 1, no film mask was applied prior to the etching; thus it was necessary for the surface to be very homogeneous. In both cases i.e. in the region around the primary weld seam, and in the region of the $CO_2$ laser treatment, it was not possible to visually distinguish the region of the weld seam from the other regions and zones of laser heat application.

EXAMPLE 3

Another steel band according to Example 1 with a transverse weld seam was subjected to the action of a $CO_2$ laser, whereith the relative movement of the $CO_2$ laser was not executed over the entire surface of the steel band, but only in a region near the transverse weld seam. The band was moved in appreciable excursions transversely to the weld seam, in a path which had a Greek key or square wave pattern or the like. Care was taken to avoid uniformity in this transverse movement. The band was then subjected to solution heat treatment (a type of annealing) 1 hr at 1050° C., following which a photosensitive coating was applied, followed by application of i.e. exposure to a photographic image of a wood grain pattern, and rinsing, exposing blank metal surfaces which were to be etched to form depressions in the metal. The band was then moved at 50 cm/hr through an acid ferric (III) chloride solution. The resulting etched pressing band appeared visually to have a completely uniform etch pattern, with no regions in which one could discern the presence of the weld seam. Pressing of a panel coated with melamine gave a product which revealed no irregularity of the intended pattern in the region of the impression from the weld seam.

The laser may emit a beam with timewise constant energy, or a pulsed beam—in the latter instance giving rise to pointwise heat application on the surface of the steel band substrate, with the point loci being either in a discrete distribution or with some (partial) overlap.

Various devices may be used for the heat application (welding and heating); e.g. electron beam welding devices, arc welding devices, autogenous welding means (e.g. oxy-acetylene torch), or the like. A constraint is that they must be capable of providing the necessary energy density.

What is claimed is:

1. An endless steel band having at least one weld seam extending transversely to the longitudinal direction of the band for use in double-band pressing, said band comprising:

a first surface layer extending over an area of the band, a second surface layer, an intermediate layer extending between said first surface layer and said second surface layer, said first surface layer having a different metallurgical microstructure from said intermediate layer, said intermediate layer extending over substantially an entire extent of the band, said second surface layer being located at an opposite surface of the band from said first surface layer, said first surface layer being made of said steel and having heat-influenced regions of a uniform character disposed neighboring or partially overlapping each other.

2. An endless steel band according to claim 1, wherein the heat-influenced regions penetrate into the steel band to the extent of 10%–50% of a thickness of said band.

3. An endless steel band according to claim 1 wherein a layer thickness of the heat-influenced regions varies with respect to the first and the second surface layer.

4. An endless steel band according to claim 1, wherein the first surface layer is formed exclusively of heat-influenced regions.

5. An endless steel band according to claim 1, wherein the weld seam consists of the same material as the endless steel band and is free of added welding materials.

6. An endless steel band according to claim 1, wherein the heat influenced regions comprise fusion penetration regions.

7. An endless steel band according to claim 1, wherein the steel is one of austenitic and martensitic steel.

8. An endless steel band according to claim 1, wherein an area of the first surface layer extends substantially over an entire area of the band.

9. An endless steel band according to claim 1, wherein the heat-influenced regions are of uniform character.

10. An endless steel band according to claim 1, wherein the weld seam consists of the same material as the endless steel band and is free of added welding materials.

11. A method of surface structuring of an endless steel band, the method comprising:

welding the ends of the band together, providing a first surface layer of the band extending planarly substantially over the entire steel band, and having a different metallurgical microstructure from an intermediate layer extending substantially over the entire extent of the steel band and disposed between said first layer and a second surface layer opposite to said first layer, said second layer also extending substantially over the entire extent of the steel band, subjecting said first layer to a heat influence by a heat-treatment device moved relative to the steel band and partially removing said first layer.

12. A method according to claim 11 wherein the heat influence is performed with a laser device.

13. A method of surface structuring according to claim 11, wherein the welding for joining the ends of the band is accomplished with a higher energy density per unit surface than the application of the heat influence for forming heat-influenced regions on the first layer.

14. A method of surface structuring according to claim 11, wherein the heat influence is performed by excursions transverse to a longitudinal direction of the steel band.

15. A method of surface structuring according to claim 11, wherein the steel band is welded, subjected to heat influence, and then heat-treated.

16. A method of surface structuring according to claim 11, wherein the steel band is subjected to surface treatment followed by welding, and then the weld seam is subjected to mechanical machining and grinding of the weld seam, after which the heat influence is applied.

17. A method according to claim 11, wherein the heat influence is produced by welding.

18. A method according to claim 11, wherein the path of the heat treatment device follows a line having one of an undulant, a Greek key and a square wave pattern.

19. A method according to claim 12, wherein the heat influence is performed with a Nd-yag laser.

20. A method according to claim 11, wherein the welding together of the ends of the bands is by a laser welding.

21. A method of surface structure according to claim 15, wherein the steel band is welded, subjected to heat influence and then heat treated by solution annealing.

22. A method of surface structuring according to claim 16, wherein the steel band is subjected to grinding followed by welding.

23. A method of surface structuring according to claim 16, wherein the weld seam is subjected to mechanical machining and grinding of the weld seam, followed thereafter by heat influence.

24. A method of surface structuring according to claim 11, wherein the partially removing of the first layer is followed by welding together of the ends of the band.

25. A method of surface structuring according to claim 11, wherein the steel is one of austenitic and martensitic steel.

26. A method of surface structuring according to claim 12, wherein the heat influence is performed by excursions transverse to a longitudinal direction of the steel band.

* * * * *